(12) United States Patent
Chen et al.

(10) Patent No.: US 10,836,386 B2
(45) Date of Patent: Nov. 17, 2020

(54) DETERMINATION OF ROLL ANGLE AND BANK ANGLE WITH SUSPENSION DISPLACEMENT DATA

(71) Applicant: GM Global Technology Operations LLC, Detroit, MI (US)

(72) Inventors: Shih-Ken Chen, Troy, MI (US); Valery Pylypchuk, West Bloomfield, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 361 days.

(21) Appl. No.: 15/809,303

(22) Filed: Nov. 10, 2017

(65) Prior Publication Data

US 2019/0143970 A1    May 16, 2019

(51) Int. Cl.
*B60W 30/14* (2006.01)
*B60G 17/019* (2006.01)
*B60W 40/076* (2012.01)
*B60W 50/14* (2020.01)

(52) U.S. Cl.
CPC ......... *B60W 30/146* (2013.01); *B60G 17/019* (2013.01); *B60W 40/076* (2013.01); *B60W 50/14* (2013.01); *B60G 2401/122* (2013.01); *B60G 2401/17* (2013.01); *B60W 2050/143* (2013.01); *B60W 2510/22* (2013.01); *B60W 2520/10* (2013.01); *B60W 2520/14* (2013.01); (Continued)

(58) Field of Classification Search
CPC .. B60W 30/146; B60W 50/14; B60W 40/076; B60W 2520/14; B60W 2050/143; B60W 2520/18; B60W 2550/142; B60W 2720/18; B60W 2520/10; B60W 2510/22; B60W 40/06; B60W 40/112; B60W 2552/15; B60G 17/019; B60G 2401/122; B60G 2401/17; B60G 2400/82; B60G 2400/204; B60G 2400/0523; B60G 2400/0511; G01C 9/00
See application file for complete search history.

(56) References Cited

U.S. PATENT DOCUMENTS

| 5,446,658 A | 8/1995 | Pastor et al. |
| 6,002,974 A | 12/1999 | Schiffmann |
| 6,073,065 A | 6/2000 | Brown et al. |

(Continued)

*Primary Examiner* — Nga X Nguyen
(74) *Attorney, Agent, or Firm* — Quinn IP Law

(57) ABSTRACT

A device includes a body operatively connected to a plurality of wheels, with the plurality of wheels being positioned relative to a banked surface defining a bank angle ($\beta$). A suspension system includes at least one suspension sensor configured to provide suspension displacement data. A controller is in communication with the at least one suspension sensor and has a processor and tangible, non-transitory memory on which is recorded instructions. The controller is configured to obtain the suspension displacement data and determine a roll angle ($\varphi$) based at least partially on the suspension displacement data. The bank angle ($\beta$) is determined based at least partially on the roll angle ($\varphi$), a yaw rate ($r$), a longitudinal velocity ($V_x$) and a plurality of predetermined parameters. Operation of the device is controlled based partly on at least one of the roll angle ($\varphi$) and the bank angle ($\beta$).

18 Claims, 2 Drawing Sheets

(52) U.S. Cl.
CPC ..... *B60W 2520/18* (2013.01); *B60W 2552/15* (2020.02); *B60W 2720/18* (2013.01)

(56) References Cited

U.S. PATENT DOCUMENTS

| | | | |
|---|---|---|---|
| 6,804,584 B2 * | 10/2004 | Tseng | B60W 40/112 |
| | | | 701/1 |
| 7,107,136 B2 | 9/2006 | Barta et al. | |
| 9,616,900 B2 | 4/2017 | Chen et al. | |
| 2003/0236603 A1 * | 12/2003 | Lu | B60G 17/0195 |
| | | | 701/37 |
| 2015/0166062 A1 * | 6/2015 | Johnson | B60W 30/12 |
| | | | 701/41 |

\* cited by examiner

DETERMINATION OF ROLL ANGLE AND BANK ANGLE WITH SUSPENSION DISPLACEMENT DATA

INTRODUCTION

The present disclosure relates to determination of roll angle and bank angle for a device using suspension displacement data. While the roll angle and the bank angle for a vehicle on a banked road may be estimated using a roll rate sensor and lateral accelerometer, a vehicle may not always be equipped with such sensors.

SUMMARY

Disclosed herein is a device having a body operatively connected to a plurality of wheels, with the plurality of wheels being positioned on a banked surface defining a bank angle ($\beta$) (relative to an environmental frame horizontal or absolute horizontal). A suspension system is operatively connected to the plurality of wheels and includes at least one suspension sensor configured to provide suspension displacement data. A controller is in communication with the suspension sensor and has a processor and tangible, non-transitory memory on which is recorded instructions. Execution of the instructions by the processor causes the controller to obtain the suspension displacement data from the suspension sensor. The controller is configured to determine a plurality of predetermined parameters, a yaw rate (r) and a longitudinal velocity ($V_x$) of the device. The plurality of predetermined parameters includes a first factor (A) and a second factor (B). A roll angle ($\varphi$) is determined based at least partially on the suspension displacement data. The controller is configured to determine the bank angle ($\beta$) based at least partially on the roll angle ($\varphi$), a yaw rate (r), a longitudinal velocity ($V_x$) and the plurality of predetermined parameters. Operation of the device is controlled based partly on at least one of the roll angle ($\varphi$) and the bank angle ($\beta$).

The first factor (A) may be based at least partially on a selected bank angle ($\beta_s$) and a selected roll angle ($\varphi_s$) corresponding to the selected bank angle ($\beta_s$) such that $$\left(A = \frac{\beta_s}{\varphi_s}\right).$$

The selected bank angle ($\beta_s$) is between 0 and 15 degrees, inclusive. The second factor (B) may be based at least partially on the first factor (A) and a gravitational constant (g) such that $$\left(B = \frac{Ag\varphi_0}{r_0 V_{x0}}\right).$$

Here $r_0$, $\varphi_0$ and $V_{x0}$ are the yaw rate, roll angle and longitudinal velocity, respectively, when the bank angle ($\beta$) is zero degrees.

The plurality of wheels includes a first wheel and a second wheel, with the device including a first axle operatively connecting the first wheel and the second wheel. The plurality of predetermined parameters includes a third factor (C), based partly on the first axle. The suspension displacement data includes a first displacement ($\Delta Z_{LF}$) between respective coordinates along a z axis of a first corner ($z=Z_1$) of the body and a center ($z=z_{u1}$) of the first wheel such that $\Delta Z_{LF} = -(Z_1 - z_{u1})$. The suspension displacement data includes a second displacement ($\Delta Z_{RF}$) between respective coordinates along the z axis of a second corner ($z=Z_2$) of the body and a center ($z=z_{u2}$) of the second wheel such that $\Delta Z_{RF} = -(Z_2 - Z_{u2})$. The roll angle ($\varphi$) may be defined as $$\varphi = \frac{(-\Delta Z_{LF} + \Delta Z_{RF})}{2C}.$$

The plurality of wheels may include a third wheel and a fourth wheel, with the device including a second axle operatively connecting the third wheel and the fourth wheel. The plurality of predetermined parameters includes a fourth factor (D), based partly on the second axle. The suspension displacement data may include a third displacement ($\Delta Z_{LR}$) between respective coordinates along the z axis of a third corner ($z=Z_3$) of the body and a center ($z=z_{u3}$) of the third wheel such that $\Delta Z_{LR} = -(Z_3 - z_{u3})$. The suspension displacement data may include a fourth displacement ($\Delta Z_{RR}$) between respective coordinates along the z axis of a fourth corner ($z=Z_4$) of the body and a center ($z=z_{u4}$) of the fourth wheel such that $\Delta Z_{RR} = -(Z_4 - z_{u4})$. The roll angle ($\varphi$) may be defined as:

$$\varphi = \frac{C(-\Delta Z_{LF} + \Delta Z_{RF}) + D(-\Delta Z_{LR} + \Delta Z_{RR})}{2(C^2 + D^2)}.$$

The plurality of predetermined parameters may include a yaw moment of inertia ($I_{zz}$), a pitch moment of inertia ($I_{yy}$), a mass (M) of the device and a distance ($Z_c$) between an overall center of gravity of the device and a center of gravity of a sprung portion of the device. The bank angle ($\beta$) is based on the roll angle ($\varphi$), the yaw rate (r), the longitudinal velocity ($V_x$), the plurality of predetermined parameters and a gravitational constant (g) such that:

$$\beta = \left[\left(A - \frac{I_{yy}}{MgZ_c}r^2\right)\varphi - B\frac{rV_x}{g}\right]\left(1 + \frac{I_{yy} - I_{zz}}{MgZ_c}r^2\right)^{-1}.$$

Controlling operation of the device based partly on at least one of the roll angle ($\varphi$) and the bank angle ($\beta$) may include transmitting a message if at least one of the roll angle ($\varphi$) and the bank angle ($\beta$) is above a respective predefined threshold. Controlling operation of the device may include limiting a speed of the device if at least one of the roll angle ($\varphi$) and the bank angle ($\beta$) is above their respective predefined thresholds.

Also disclosed is a method of controlling operation of a device having a body operatively connected to a plurality of wheels, the plurality of wheels being positioned relative to a banked surface defining a bank angle ($\beta$), a suspension system operatively connected to the plurality of wheels and having at least one suspension sensor, and a controller in communication with the at least one suspension sensor. The method enables online estimation of the roll angle ($\varphi$) and the bank angle ($\beta$) without requiring the following: a roll rate sensor, a lateral accelerometer, an observer, a tire model, tire sensors or road information. The method enables reduced cost and reduced complexity.

The method includes obtaining suspension displacement data from the suspension sensor and obtaining a plurality of predetermined parameters, a yaw rate (r) and a longitudinal velocity ($V_x$). The plurality of predetermined parameters includes a first factor (A) and a second factor (B). The method includes determining a roll angle ($\varphi$) based at least partially on the suspension displacement data and determining the bank angle ($\beta$) based at least partially on the roll angle ($\varphi$), the yaw rate (r), the longitudinal velocity ($V_x$) and the plurality of predetermined parameters. Operation of the device is controlled based partly on at least one of the roll angle ($\varphi$) and the bank angle ($\beta$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
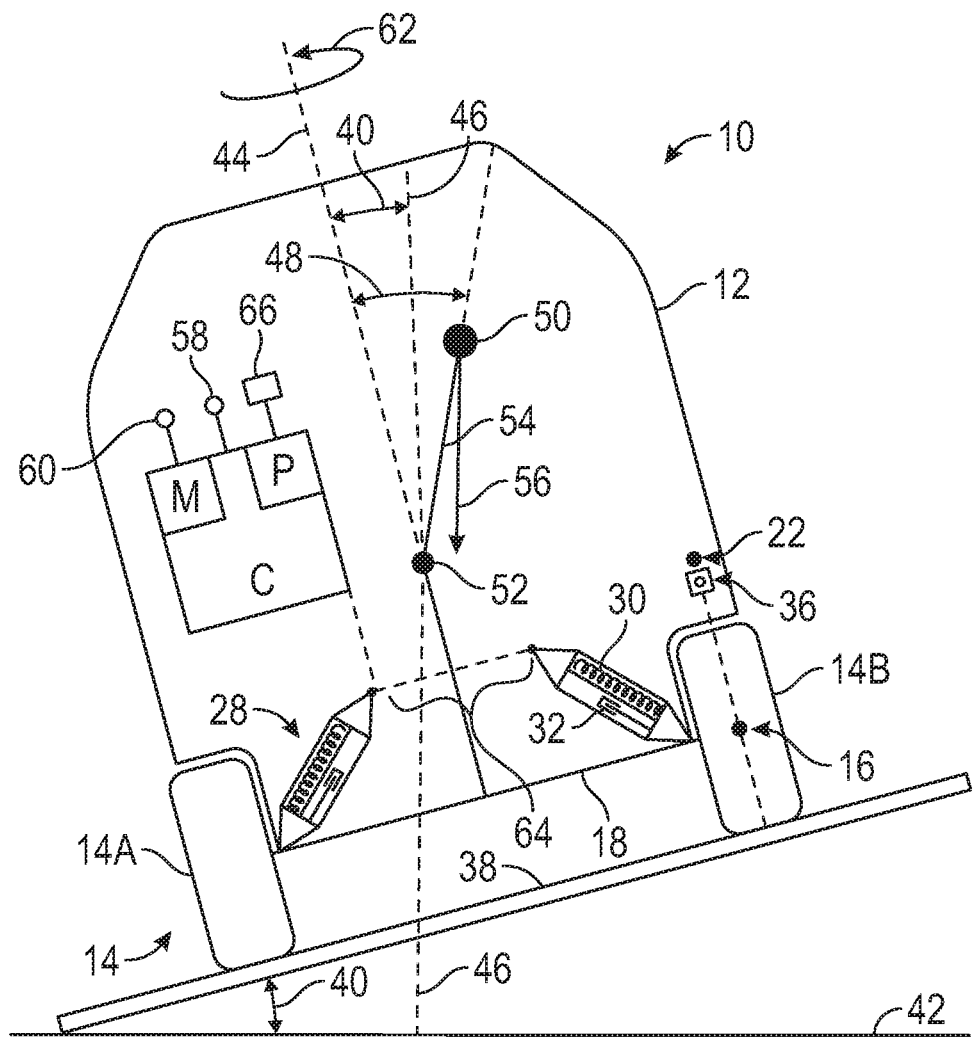
FIG. 1 is a schematic front view of a device having a plurality of wheels, a suspension system and a controller.
Figure 2:
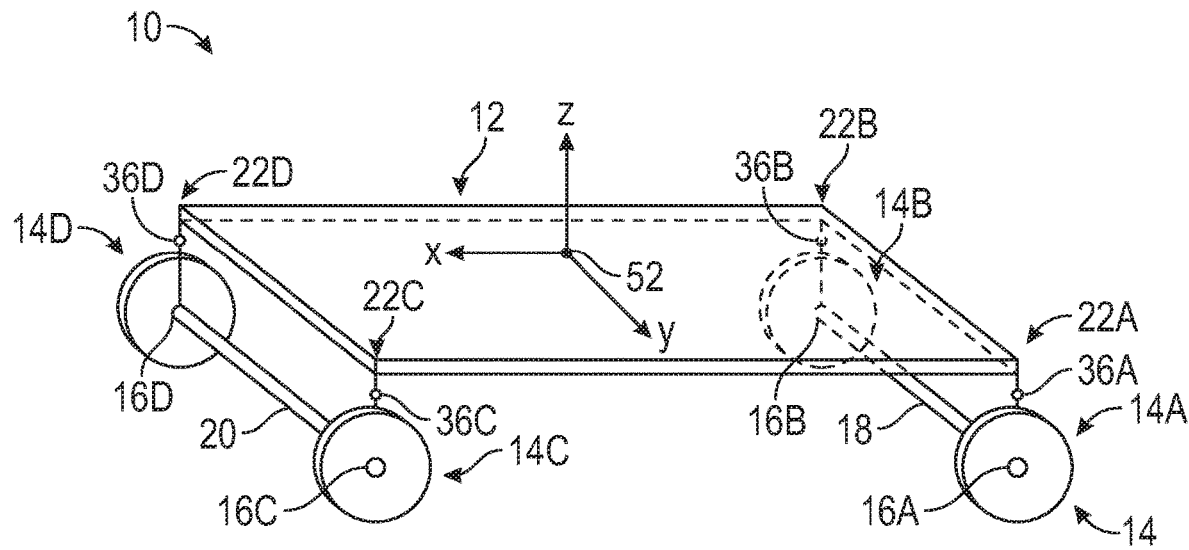
FIG. 2 is a schematic fragmentary perspective diagram of the device of FIG. 1.

Referring to the drawings, wherein like reference numbers refer to like components, FIGS. 1 and 2 schematically illustrate a device 10 having a body 12 operatively connected to a plurality of wheels 14. The device 10 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device. The device 10 may take many different forms and include multiple and/or alternate components and facilities. While an example of a device 10 is shown in the FIGS. 1 and 2, the components illustrated in the FIGS. are not intended to be limiting.

Referring to FIGS. 1 and 2, the plurality of wheels 14 includes a first wheel 14A and a second wheel 14B. The device 10 may include first, second, third and fourth wheels 14A, 14B, 14C, 14D, respectively, shown in FIG. 2. It is to be understood that the number of wheels in the device 10 may be varied. Each of the plurality of wheels 14 defines a respective center 16. Referring to FIG. 2, the first, second, third and fourth centers 16A, 16B, 16C, 16D are shown.

Referring to FIGS. 1 and 2, the device 10 includes a first axle 18 operatively connecting the first wheel 14A and the second wheel 14B. Referring to FIG. 2, a second axle 20 may operatively connect the third wheel 14C and the fourth wheel 14D. Referring to FIG. 2, the body 12 defines a plurality of edges or corners 22. Referring to FIG. 2, in the embodiment shown, the body 12 includes first, second, third and fourth corners 22A, 22B, 22C, 22D respectively.

Referring to FIG. 1, the device 10 includes a suspension system 28 operatively connected to the plurality of wheels 14. The suspension system 28 may include springs 30, dampers 32 and various other components (not shown). Referring to FIG. 1, the suspension system 28 includes at least one suspension sensor 36 configured to provide suspension displacement data, i.e., the relative displacement of various local segments of the springs 30, dampers 32, or other components of the suspension system 28. The suspension sensor 36 may be installed in various positions, with variations in installation depending upon the design of the device 10. The number of suspension sensors 36 may be varied based on the device 10 (see sensors 36A, B, C and D shown in FIG. 2).

It is to be understood that the device 10 may employ any type of suspension and sensor technology available to those skilled in the art. For example, the suspension sensor 36 may include a strain gage configured to vary its electrical resistance with a variation of strain elements at the surface of installation. The strain elements may be defined as the relative displacement of a local segment of spring, shock absorber, or other component of the suspension mount. The resistance change of the strain gage may be measured using a Wheatstone bridge (not shown) or other unit. The suspension sensor 36 may be configured to convert the resistance change of the strain gage into electrical stimuli for transmission to a controller C.

Alternatively, the suspension sensor 36 may include a magnetorheological (MR) or carrier fluid which is filled with micrometer-sized magnetic particles. When subjected to a magnetic field, the magnetic particles increase the viscosity of the fluid, rendering it viscoelastic solid. The suspension sensor 36 may be configured to convert the change in physical properties of the magnetorheological fluid (MR) into electrical stimuli for transmission to a controller C.

Referring to FIG. 1, the device 10 is positioned on a banked surface 38. A surface bank angle 40, referred to herein as bank angle 40 ($\beta$), is the angle formed between the banked surface 38 on which the device 10 is positioned and an environmental frame horizontal 42, which may be referred to as the earth plane or sea plane or absolute horizontal. A vertical center line 44 of the device 10, extending vertically in a device frame when the device 10 has no roll, is indicated in FIG. 1. The vertical center line 44 is generally perpendicular to the first axle 18. The environmental frame vertical 46 is shown in FIG. 1.

Referring to FIG. 1, the device 10 includes a controller C in communication (e.g., capable of sending and receiving data and/or instructions) with the suspension sensor 36 and various other components of the device 10. The controller C includes at least one processor P and at least one memory M (non-transitory, tangible computer readable storage medium) on which instructions are recorded for executing method 100 (shown in FIG. 3) for determining a roll angle 48 ($\varphi$) (see FIG. 1) and the bank angle 40 ($\beta$). The memory M can store controller-executable instruction sets, and the processor P can execute the controller-executable instruction sets stored in the memory M. The controller C of FIG. 1 is specifically programmed to execute the steps of the method 100.

Referring to FIG. 1, the roll angle 48 ($\varphi$) is an angle between a sprung portion of the device 10 and the balance of the device 10, the sprung portion being that portion connected above the suspension system 28 and the plurality of wheels 14. Referring to FIG. 1, a sprung mass point 50 indicates the center of gravity of the sprung portion. As shown in FIG. 1, the overall center of gravity 52 and the sprung mass point 50 are separated by a distance 54 ($Z_c$). A gravity vector 56 indicates the direction that gravity (approximately 9.81 m/s$^2$) is acting on the device 10.

Figure 3:
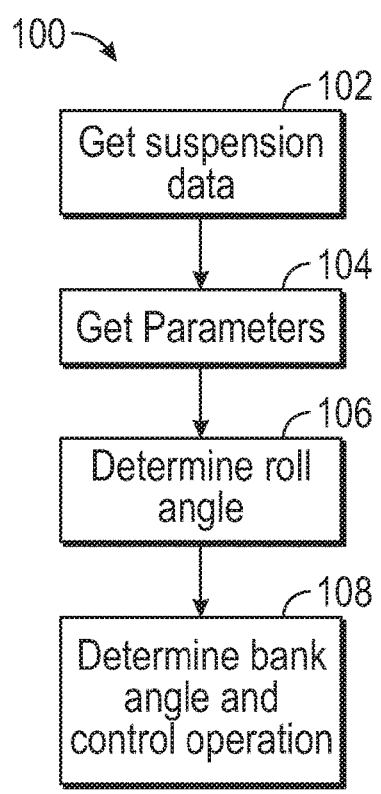
FIG. 3 is a schematic flow diagram for a method executable by the controller of FIG. 1.

Referring now to FIG. 3, a flowchart of the method 100 stored on and executable by the controller C of FIG. 1 is shown. Method 100 need not be applied in the specific order recited herein. Furthermore, it is to be understood that some steps may be eliminated. Using method 100, the roll angle 48 ($\varphi$) and the bank angle 40 ($\beta$) may be determined without requiring the following: a roll rate sensor, a lateral accelerometer, an observer, a tire model, tire sensors or road information. The operating principle is partially based on separating the centrifugal and banking effects in the suspension displacement data without using accelerometer and roll rate sensor data.

Referring to FIG. 3, method 100 may begin with block 102, where the controller C is programmed or configured to obtain suspension displacement data via the suspension sensor 36, including respective real-time displacements for each of the plurality of wheels 14. The displacement is positive for compressions. If the device 10 includes at least two wheels, the suspension displacement data includes a first displacement ($\Delta Z_{LF}$) (left front) and a second displacement ($\Delta Z_{RF}$) (right front). Referring to FIG. 2, the first displacement ($\Delta Z_{LF}$) is defined as a difference between respective coordinates along the z axis (x, y and z axes shown in FIG. 2) of the first corner 22A ($z=Z_1$) of the body 12 and a center 16A of the first wheel 14A ($z=z_{u1}$) such that $\Delta Z_{LF}=-(Z_1-z_{u1})$. The second displacement ($\Delta Z_{RF}$) is between respective coordinates along the z axis ($z=Z_2$) of a second corner 22B of the body 12 and a center 16B ($z=z_{u2}$) of the second wheel 14B such that $\Delta Z_{RF}=-(Z_2-z_{u2})$.

If the device 10 has more than two wheels, the suspension displacement data may further include a third displacement ($\Delta Z_{LR}$) (left rear) and a fourth displacement ($\Delta Z_{RR}$) (right rear). Referring to FIG. 2, the third displacement ($\Delta Z_{LR}$) is between respective coordinates along the z axis of a third corner 22C ($z=Z_3$) of the body 12 and a center 16C ($z=z_{u3}$) of the third wheel 14C such that $\Delta Z_{LR}=-(Z_3-z_{u3})$. The suspension displacement data may include between respective coordinates along the z axis of a fourth corner 22D ($z=Z_4$) of the body 12 and a center 16D ($z=z_{u4}$) of the fourth wheel 14D such that $\Delta Z_{RR}=-(Z_4-z_{u4})$.

In block 104 of FIG. 3, the controller C is programmed or configured to obtain a plurality of predetermined parameters, a yaw rate 62 (r) and a longitudinal velocity ($V_x$). The device 10 may include a speed sensor 58 configured to obtain the longitudinal velocity ($V_x$) and a yaw-rate sensor 60 configured to obtain the yaw rate 62 (r). The yaw-rate sensor 60 may be a gyroscopic device configured to measure angular velocity. Additionally, the longitudinal velocity ($V_x$), yaw rate 62 (r) and other parameters may be obtained via "virtual sensing", such as for example, modeling based on other measurements.

The plurality of predetermined parameters includes a first factor (A) and a second factor (B). The first factor (A) may be based at least partially on a selected bank angle ($\beta_s$) and a selected roll angle ($\varphi_s$) corresponding to the selected bank angle ($\beta_s$) such that $$\left(A = \frac{\beta_s}{\varphi_s}\right).$$

The selected bank angle ($\beta_s$) is between 0 and 15 degrees, inclusive. The second factor (B) may be based at least partially on the first factor (A) and a gravitational constant (g) such that $$\left(B = \frac{A g \varphi_0}{r_0 V_{x0}}\right).$$

Here $r_0$, $\varphi_0$ and $V_{x0}$ are the yaw rate 62, roll angle 48 and longitudinal velocity, respectively, when the bank angle ($\beta$) is zero degrees. The first factor (A) and the second factor (B) may be determined in a test cell or under laboratory conditions with the device 10.

The plurality of predetermined parameters may include a yaw moment of inertia ($I_{zz}$), a pitch moment of inertia ($I_{yy}$), a (total) mass (M) of the device 10 and the distance 54 ($Z_c$) between the overall center of gravity 52 of the device 10 and the sprung mass point 50 (center of gravity of the sprung portion of the device 10) (see FIG. 1). The moment of inertia, also referred to as the angular mass or rotational inertia, of a rigid body determines the torque needed for a desired angular acceleration about a rotational axis, such as the y-axis for pitch movement or the x-axis for roll movement. The moment of inertia depends on a body's mass distribution and the axis chosen, with larger moments requiring more torque to change the body's rotation. The predetermined parameters may vary in real-time or may be constant for each device 10. The yaw moment of inertia ($I_{zz}$), pitch moment of inertia ($I_{yy}$) and mass (M) may be predefined with respective initial values for a given device 10 and calibrated in real time afterwards.

Referring to FIG. 2, the plurality of predetermined parameters may include a third factor (C) and a fourth factor (D), based partly on the first axle 18 and the second axle 20, respectively. In one embodiment, the third and fourth factors (C) and (D) are defined as one half of a spring base 64 (see FIG. 1) of the first axle 18 and the second axle 20, respectively. In another embodiment, the third and fourth factors (C) and (D) are defined as one half of the respective track lengths of the first axle 18 and the second axle 20.

In block 106 of FIG. 3, the controller C is programmed or configured to determine the roll angle 48 ($\varphi$) based at least partially on the suspension displacement data and at least one of the third factor (C) and the fourth factor (D) (determined in block 104). For a device 10 with at least four wheels, the roll angle 48 ($\varphi$) may be defined as:

$$\varphi = \frac{C(-\Delta Z_{LF} + \Delta Z_{RF}) + D(-\Delta Z_{LR} + \Delta Z_{RR})}{2(C^2 + D^2)}.$$

For a device 10 with at least two wheels, the roll angle 48 ($\varphi$) may be defined as $$\varphi = \frac{(-\Delta Z_{LF} + \Delta Z_{RF})}{2C}.$$

In block 108 of FIG. 3, the controller C is programmed or configured to determine the bank angle 40 ($\beta$) (see FIG. 1) and control operation of the device 10 based partly on at least one of the roll angle 48 ($\varphi$) and the bank angle 40 ($\beta$). The bank angle 40 ($\beta$) is based at least partially on the roll angle 48 ($\varphi$), the yaw rate 62 (r), the longitudinal velocity ($V_x$), the plurality of predetermined parameters, including the first factor (A), the second factor (B), the yaw moment of inertia ($I_{zz}$), the pitch moment of inertia ($I_{yy}$), the distance 54 ($Z_c$), the mass (M) and a gravitational constant (g), such that:

$$\beta = \left[\left(A - \frac{I_{yy}}{MgZ_c}r^2\right)\varphi - B\frac{rV_x}{g}\right]\left(1 + \frac{I_{yy} - I_{zz}}{MgZ_c}r^2\right)^{-1}.$$

Controlling operation of the device 10 based at least partially on at least one of the roll angle 48 ($\varphi$) and the bank angle 40 ($\beta$) may include: transmitting a message if at least one of the roll angle 48 ($\varphi$) and the bank angle 40 ($\beta$) is above a respective predefined threshold. The message may include, but is not limited to, a visual message displayed on an instrument panel 66 of the device 10, an audible chime or a haptic alert. If the device 10 is an autonomous vehicle, the message may be transmitted to a fleet operator. The respective predefined thresholds may be selected based on the particular device 10. In one example, the respective predefined thresholds are 5 degrees and 10 degrees, respectively, for the roll angle 48 ($\varphi$) and the bank angle 40 ($\beta$).

Controlling operation of the device 10 may include limiting the speed of the device 10 if at least one of the roll angle 48 ($\varphi$) and the bank angle 40 ($\beta$) is above their respective predefined thresholds. The roll angle 48 ($\varphi$) and the bank angle 40 ($\beta$) play significant roles in the dynamics of the device 10 and may be employed as inputs for various control algorithms, including adaptive cruise control modules and stability control modules, thereby improving the functioning of the device 10. Additionally, the roll angle 48 ($\varphi$) and the bank angle 40 ($\beta$) may be used in support of autonomous driving functions, particularly when the device 10 is turning and/or when the road surface is rapidly changing. The method 100 enables online estimation of the roll angle 48 ($\varphi$) and the bank angle 40 ($\beta$) without requiring the following: a roll rate sensor, a lateral accelerometer, an observer, a tire model, tire sensors or road information, thereby enabling reduced cost and reduced complexity.

The controller C of FIG. 1 may be an integral portion of, or a separate module operatively connected to, other controllers of the device 10. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A device comprising:
   a body operatively connected to a plurality of wheels, the plurality of wheels being positioned on a banked surface defining a bank angle ($\beta$);
   a suspension system operatively connected to the plurality of wheels and having at least one suspension sensor configured to provide suspension displacement data;
   a controller in communication with the at least one suspension sensor and having a processor and tangible, non-transitory memory on which instructions are recorded, execution of the instructions by the processor causing the controller to:
   obtain the suspension displacement data from the at least one suspension sensor;
   obtain a plurality of predetermined parameters, a yaw rate (r) and a longitudinal velocity ($V_x$), the plurality of predetermined parameters including a first factor (A) and a second factor (B);
   determine a roll angle ($\varphi$) based at least partially on the suspension displacement data;
   determine the bank angle ($\beta$) based at least partially on the roll angle ($\varphi$), the yaw rate (r), the longitudinal velocity ($V_x$) and the plurality of predetermined parameters; and
   control operation of the device based partly on at least one of the roll angle ($\varphi$) and the bank angle ($\beta$); and
   wherein the first factor (A) is based at least partially on a selected bank angle ($\beta_s$) and a selected roll angle ($\varphi_s$) corresponding to the selected bank angle such that $$\left(A = \frac{\beta_s}{\varphi_s}\right),$$

the selected bank angle ($\beta_s$) being between 0 and 15 degrees, inclusive.

2. The device of claim 1, wherein:
   the second factor (B) is based at least partially on the first factor (A) and a gravitational constant (g) such that $$\left(B = \frac{Ag\varphi_0}{r_0 V_{x0}}\right);$$

and r$_0$, φ$_0$ and V$_{x0}$ are the yaw rate, roll angle and longitudinal velocity, respectively, when the bank angle (β) is zero degrees.

3. The device of claim 1, wherein the plurality of wheels includes a first wheel and a second wheel, and further comprising:
  a first axle operatively connecting the first wheel and the second wheel, the plurality of predetermined parameters including a third factor (C) based partly on the first axle;
  wherein the suspension displacement data includes a first displacement ($\Delta Z_{LF}$) between respective coordinates along a z axis of a first corner ($z=Z_1$) of the body and a center ($z=z_{u1}$) of the first wheel such that $\Delta Z_{LF}=-(Z_1-z_{u1})$; and
  wherein the suspension displacement data includes a second displacement ($\Delta Z_{RF}$) between respective coordinates along the z axis of a second corner ($z=Z_2$) of the body and a center ($z=z_{u2}$) of the second wheel such that $\Delta Z_{RF}=-(Z_2-z_{u2})$.

4. The device of claim 3, wherein the roll angle (φ) is defined as:

$$\varphi = \frac{(-\Delta Z_{LF} + \Delta Z_{RF})}{2C}.$$

5. The device of claim 3, wherein the plurality of wheels includes a third wheel and a fourth wheel, and further comprising:
  a second axle operatively connecting the third wheel and the fourth wheel, the plurality of predetermined parameters including a fourth factor (D) based partly on the second axle;
  wherein the suspension displacement data includes a third displacement ($\Delta Z_{LR}$) between respective coordinates along the z axis of a third corner ($z=Z_3$) of the body and a center ($z=z_{u3}$) of the third wheel such that $\Delta Z_{LR}=-(Z_3-z_{u3})$; and
  wherein the suspension displacement data includes a fourth displacement ($\Delta Z_{RR}$) between respective coordinates along the z axis of a fourth corner ($z=Z_4$) of the body and a center ($z=z_{u4}$) of the fourth wheel such that $\Delta Z_{RR}=-(Z_4-z_{u4})$.

6. The device of claim 5, wherein the roll angle (φ) is defined as:

$$\varphi = \frac{C(-\Delta Z_{LF} + \Delta Z_{RF}) + D(-\Delta Z_{LR} + \Delta Z_{RR})}{2(C^2 + D^2)}.$$

7. The device of claim 1, wherein:
  the plurality of predetermined parameters includes a yaw moment of inertia ($I_{zz}$), a pitch moment of inertia ($I_{yy}$), a mass (M) and a distance ($Z_c$) between an overall center of gravity of the device and a center of gravity of a sprung portion of the device; and
  the bank angle (β) is based on the roll angle (φ), the yaw rate (r), the longitudinal velocity ($V_x$), the plurality of predetermined parameters and a gravitational constant (g) such that:

$$\beta = \left[\left(A - \frac{I_{yy}}{MgZ_c}r^2\right)\varphi - B\frac{rV_x}{g}\right]\left(1 + \frac{I_{yy} - I_{zz}}{MgZ_c}r^2\right)^{-1}.$$

8. The device of claim 1, wherein controlling operation of the device based partly on at least one of the roll angle (φ) and the bank angle (β) includes:
  transmitting a message if at least one of the roll angle (φ) and the bank angle (β) is above a respective predefined threshold.

9. The device of claim 1, wherein controlling operation of the device based partly on at least one of the roll angle (φ) and the bank angle (β) includes:
  limiting a speed of the device if at least one of the roll angle (φ) and the bank angle (β) is above a respective predefined threshold.

10. A method of controlling operation of a device having a body operatively connected to a plurality of wheels, the plurality of wheels being positioned on a banked surface defining a bank angle (β), a suspension system operatively connected to the plurality of wheels and having at least one suspension sensor, a controller in communication with the at least one suspension sensor and having a processor and tangible, non-transitory memory on which is recorded instructions, the method comprising:
  obtaining a suspension displacement data from the at least one suspension sensor;
  obtaining a plurality of predetermined parameters, a yaw rate (r) and a longitudinal velocity ($V_x$), the plurality of predetermined parameters including a first factor (A) and a second factor (B);
  obtaining the first factor (A) based at least partially on a selected bank angle ($\beta_s$) and a selected roll angle ($\varphi_s$) corresponding to the selected bank angle such that $$\left(A = \frac{\beta_s}{\varphi_s}\right),$$

the selected bank angle ($\beta_s$) being between 0 and 15 degrees, inclusive;
  determining a roll angle (φ) based at least partially on the suspension displacement data;
  determining the bank angle (β) based at least partially on the roll angle (φ), the yaw rate (r), the longitudinal velocity ($V_x$) and the plurality of predetermined parameters; and
  controlling operation of the device based partly on at least one of the roll angle (φ) and the bank angle (β).

11. The method of claim 10, further comprising:
  obtaining the second factor (B) based at least partially on the first factor (A) and a gravitational constant (g) such that $$\left(B = \frac{Ag\varphi_0}{r_0 V_{x0}}\right);$$

and
  wherein r$_0$, φ$_0$ and V$_{x0}$ are the yaw rate, roll angle and longitudinal velocity, respectively, when the bank angle (β) is zero degrees.

12. The method of claim 10, wherein the plurality of wheels includes a first wheel and a second wheel, and the device includes a first axle operatively connecting the first wheel and the second wheel, wherein:
  obtaining the plurality of predetermined parameters includes obtaining a third factor (C) based partly on the first axle;

obtaining the suspension displacement data includes obtaining a first displacement ($\Delta Z_{LF}$) between respective coordinates along a z axis of a first corner ($z=Z_1$) of the body and a center ($z=z_{u1}$) of the first wheel such that $\Delta Z_{LF}=-(Z_4-z_{u1})$;

obtaining the suspension displacement data includes obtaining a second displacement ($\Delta Z_{RF}$) between respective coordinates along the z axis of a second corner ($Z_2$) of the body and a center ($z=z_{u2}$) of the second wheel such that $\Delta Z_{RF}=-(Z_2-z_{u2})$; and the roll angle ($\varphi$) is defined as:

$$\varphi = \frac{(-\Delta Z_{LF} + \Delta Z_{RF})}{2C}.$$

13. The method of claim 12, wherein the plurality of wheels includes a third wheel and a fourth wheel, and the device includes a second axle operatively connecting the third wheel and the fourth wheel, wherein:

obtaining the plurality of predetermined parameters includes obtaining a fourth factor (D) based partly on the second axle;

obtaining the suspension displacement data includes obtaining a third displacement ($\Delta Z_{LR}$) between respective coordinates along the z axis of a third corner ($z=Z_3$) of the body and a center ($z=z_{u3}$) of the third wheel such that $\Delta Z_{LR}=-(Z_3-z_{u3})$; and obtaining the suspension displacement data includes obtaining a fourth displacement ($\Delta Z_{RR}$) between respective coordinates along the z axis of a fourth corner ($z=Z_4$) of the body and a center ($z=z_{u4}$) of the fourth wheel such that $\Delta Z_{RR}=-(Z_4-z_{u4})$.

14. The method of claim 13, wherein the roll angle ($\varphi$) is defined as:

$$\varphi = \frac{C(-\Delta Z_{LF} + \Delta Z_{RF}) + D(-\Delta Z_{LR} + \Delta Z_{RR})}{2(C^2 + D^2)}.$$

15. The method of claim 10, wherein:

obtaining the plurality of predetermined parameters includes obtaining a yaw moment of inertia ($I_{zz}$), a pitch moment of inertia ($I_{yy}$), a mass (M) and a distance ($Z_c$) between an overall center of gravity of the device and a center of gravity of a sprung portion of the device; and the bank angle ($\beta$) is based on the roll angle ($\varphi$), the yaw rate (r), the longitudinal velocity ($V_x$), the plurality of predetermined parameters and a gravitational constant (g) such that:

$$\beta = \left[\left(A - \frac{I_{yy}}{MgZ_c}r^2\right)\varphi - B\frac{rV_x}{g}\right]\left(1 + \frac{I_{yy} - I_{zz}}{MgZ_c}r^2\right)^{-1}.$$

16. The method of claim 10, wherein controlling operation of the device based partly on at least one of the roll angle ($\varphi$) and the bank angle ($\beta$) includes:

transmitting a message if at least one of the roll angle ($\varphi$) and the bank angle ($\beta$) is above a respective predefined threshold.

17. The method of claim 10, wherein controlling operation of the device based partly on at least one of the roll angle ($\varphi$) and the bank angle ($\beta$) includes:

limiting a speed of the device if at least one of the roll angle ($\varphi$) and the bank angle ($\beta$) is above a respective predefined threshold.

18. A device comprising:

a body operatively connected to a plurality of wheels, the plurality of wheels being positioned on a banked surface defining a bank angle ($\beta$);

a suspension system operatively connected to the plurality of wheels and having at least one suspension sensor configured to provide suspension displacement data, the plurality of wheels including a first wheel and a second wheel;

a first axle operatively connecting the first wheel and the second wheel;

a controller in communication with the at least one suspension sensor and having a processor and tangible, non-transitory memory on which instructions are recorded, execution of the instructions by the processor causing the controller to:

obtain the suspension displacement data from the at least one suspension sensor;

obtain a plurality of predetermined parameters, a yaw rate (r) and a longitudinal velocity ($V_x$), the plurality of predetermined parameters including a first factor (A), a second factor (B), and a third factor (C);

determine a roll angle ($\varphi$) based at least partially on the suspension displacement data;

determine the bank angle ($\beta$) based at least partially on the roll angle ($\varphi$), the yaw rate (r), the longitudinal velocity ($V_x$) and the plurality of predetermined parameters; and control operation of the device based partly on at least one of the roll angle ($\varphi$) and the bank angle ($\beta$);

wherein the second factor (B) is based at least partially on the first factor (A) and a gravitational constant (g) such that $$\left(B = \frac{Ag\varphi_0}{r_0 V_{x0}}\right)$$

and $r_0$, $\varphi_0$ and $V_{x0}$ are the yaw rate, roll angle and longitudinal velocity, respectively, when the bank angle ($\beta$) is zero degrees;

wherein the suspension displacement data includes a first displacement ($\Delta Z_{LF}$) between respective coordinates along a z axis of a first corner ($z=Z_1$) of the body and a center ($z=z_{u1}$) of the first wheel such that $\Delta Z_{LF}=-(Z_1-z_{u1})$; and wherein the suspension displacement data includes a second displacement ($\Delta Z_{RF}$) between respective coordinates along the z axis of a second corner ($z=Z_2$) of the body and a center ($z=z_{u2}$) of the second wheel such that $\Delta Z_{RF}=-(Z_2-z_{u2})$.

* * * * *